United States Patent
Han et al.

(10) Patent No.: US 7,935,321 B2
(45) Date of Patent: May 3, 2011

(54) METHOD OF PREPARING BISMUTH OXIDE AND APPARATUS THEREFOR

(75) Inventors: Seung Wok Han, Seoul (KR); Dong Eon Kim, Gyeonggi-do (KR); Byung Gil Lim, Incheon (KR)

(73) Assignee: Dansuk Industrial Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/451,031

(22) PCT Filed: Jul. 23, 2007

(86) PCT No.: PCT/KR2007/003538
§ 371 (c)(1),
(2), (4) Date: Oct. 23, 2009

(87) PCT Pub. No.: WO2008/133372
PCT Pub. Date: Nov. 6, 2008

(65) Prior Publication Data
US 2010/0092378 A1   Apr. 15, 2010

(30) Foreign Application Priority Data

Apr. 25, 2007   (KR) .................. 10-2007-0040222

(51) Int. Cl.
*C01G 29/00*  (2006.01)
(52) U.S. Cl. .......... 423/87; 423/617; 422/189; 422/209; 266/200; 266/217; 266/225; 266/235; 266/239
(58) Field of Classification Search .......... 423/617, 423/87; 422/187, 189, 209, 224–229; 266/200, 266/217, 225, 235, 239
See application file for complete search history.

(56) References Cited

U.S. PATENT DOCUMENTS

| | | | |
|---|---|---|---|
| 1,318,336 A | 10/1919 | Ellis | |
| 1,354,806 A | 10/1920 | Darling | |
| 2,327,496 A * | 8/1943 | Burch | 175/13 |
| 2,330,487 A * | 9/1943 | Grace | 266/145 |
| 4,675,171 A | 6/1987 | Kubo et al. | |
| 4,873,073 A | 10/1989 | Matsui et al. | |

FOREIGN PATENT DOCUMENTS

| | | |
|---|---|---|
| EP | 0 704 408 A1 | 4/1996 |
| JP | 47-11335 | 6/1972 |
| JP | 61-136922 A | 6/1986 |
| JP | 2-55222 A | 2/1990 |
| KR | 10-2004-0082229 A | 9/2004 |

OTHER PUBLICATIONS

Zack Kelly and Funsho Ojebueboh; Producing Bismuth Trioxide and Its Application in Fire Assaying; ABI/INFORM Trade & Industry; Apr. 2002; pp. 42-45.
Ullmann's Encyclopedia of Industrial Chemistry; Bismuth, Bismuth Alloys, and Bismuth Compounds; vol. A4, pp. 185-186.

* cited by examiner

*Primary Examiner* — Steven Bos
(74) *Attorney, Agent, or Firm* — Marshall & Melhorn, LLC

(57) ABSTRACT

A method of preparing bismuth oxide and an apparatus therefor are disclosed. The method includes: melting bismuth metal; transporting the melted bismuth metal to an open first reactor and oxidizing the melted bismuth metal while stirring at a temperature of 300-650° C.; and transporting bismuth oxide and un-reacted material to a closed second reactor through a screw and oxidizing the bismuth oxide and un-reacted material while rotating the closed second reactor at a temperature of 300-600° C. with a supply of air or oxygen.

17 Claims, 3 Drawing Sheets

METHOD OF PREPARING BISMUTH OXIDE AND APPARATUS THEREFOR

TECHNICAL FIELD

The present invention relates to a method of preparing bismuth oxide and an apparatus therefor. More particularly, the present invention relates to a method of preparing bismuth oxide by melting bismuth metal at a low temperature, stirring the melted bismuth in an open reactor at 300-650° C., and oxidizing the obtained product in a closed reactor by supplying oxygen, and an apparatus therefor.

Bismuth oxide generally refers to bismuth trioxide ($Bi_2O_3$) having high electric conductivity, and is used variously for disinfectant, magnet, glass, gum, anti-flame paper, catalyst and so on. Accordingly, demand of bismuth oxide is increasing, and especially demand for bismuth oxide with high-purity is increasing in the electronic industry.

Bismuth oxide is classified into 4 isomer types of α-type, β-type, γ-type, and δ-type according to its crystal structure, and α-bismuth oxide is generally used in the industry.

BACKGROUND ART

Bismuth oxide is conventionally prepared by one of the following methods: oxidizing fine powder bismuth by burning bismuth or injecting it into a heated zone (Patent Reference 1); dissolving bismuth metal in sodium nitrate by heating and passing chlorine gas (Patent Reference 2); neutralizing aqueous solution of bismuth nitrate with sodium hydroxide or potassium hydroxide, and precipitating the neutralized solution at 40-70° C. to obtain needle-crystalline bismuth oxide (Patent Reference 3); obtaining bismuth-mono-carboxylic acid complex in an aqueous solution by adding mono-carboxylic acid to trivalent bismuth ions, further precipitating the complex by adding an alkali in an aqueous solution, and separating the complex from the solution, and obtaining fine spherical bismuth oxide particles by firing the separated the complex (Patent Reference 4); vaporizing bismuth by heating at a high temperature, and supplying air to the vaporized bismuth (Patent Reference 5); obtaining bismuth nitrate solution by adding nitric acid and hydrogen peroxide to bismuth metal grains or powder, separating the precipitant by adding sodium hydroxide to the solution and heating, and washing, drying, classifying the separated precipitant, and obtaining bismuth oxide (Non-patent Reference 1); oxidizing fine particle bismuth metal by injecting air and heating at 850°-900° C. (Non-patent Reference 1); and other methods such as oxidizing bismuth metal at 750-800° C., pyrolyzing bismuth carbonate, and adding alkaline metal hydroxide to bismuth salt solution (Non-patent Reference 2).

Patent Reference 1: U.S. Pat. No. 1,318,336
Patent Reference 2: U.S. Pat. No. 1,354,806
Patent Reference 3: Japanese Patent Publication No. Sho 47-11335
Patent Reference 4: U.S. Pat. No. 4,873,073
Patent Reference 5: Japanese Patent Publication No. Sho 61-136922
Non-patent Reference 1: JOM; April 2002; 54, 4; ABI/INFORM Trade & Industry
Non-patent Reference 2: Ullman's Encyclopedia of Industrial Chemistry, Vol. 5, pp. 185-186

DISCLOSURE OF INVENTION

Technical Problem

In the prior art, although Patent Reference 1 does not disclose the temperatures of melting and oxidizing bismuth. Referring to Non-patent References 1 and 2, this reaction is supposed to be executed at 750-900° C. However, a method of performing a reaction at a high temperature requires a high energy cost, and a final product prepared according to the method may lose competitiveness in the market.

The methods of preparing bismuth oxide by using a bismuth salt, such as bismuth nitrate, according to the Patent References 3 and 4 must be performed in two steps of preparing bismuth nitrate and obtaining bismuth oxide from the prepared bismuth nitrate, whose process is complicated and not economical. In the case of preparing bismuth oxide from purchased bismuth nitrate, the price of bismuth nitrate is high and bismuth nitrate is not easily available. Therefore it may result in a high production cost.

Further in a wet process of the Patent References 3 and 4, by-products must be eliminated by washing after separation of bismuth oxide. Therefore, this process may cause environmental pollution, and water treatment cost of washing and reaction effluent is high. Further, operating environment of the process is inferior and small amount of residual acids contained in the prepared bismuth oxide may deteriorate quality of the bismuth oxide. Therefore, it cannot meet the requirements of high-purity bismuth oxide.

A method of preparing bismuth oxide according to the Patent Reference 5 utilizes a vapor-phase reaction and requires high energy consumption, long processing time and precision facilities. Further, the particle size of prepared bismuth oxide is extremely fine (equivalent to several nanometers). Therefore, manufacturing and maintenance costs of high temperature resistant filters used for collection of the prepared fine bismuth oxide are very high, and thereby a production facility of this method becomes expensive and uneconomical.

Technical Solution

The present invention has been made in view of the above problems, and the present invention provides a method of preparing high-purity a-bismuth oxide with a high yield by melting bismuth metal ingot at a temperature higher than 300° C. (preferably at 400-450° C.), transporting the melted bismuth metal to a first reactor that is open to air, oxidizing bismuth while stirring at the temperature at 300-650° C., collecting bismuth oxide in a collecting tank having an exhaust fan, and reacting the collected bismuth oxide with oxygen again in a second reactor at 300-600° C.

Advantageous Effects

According to the present invention, high-purity α-bismuth oxide may be prepared economically by melting bismuth metal at a temperature near the melting point of bismuth, which is much lower than a conventional condition (700° C. or higher), oxidizing the melted bismuth, and oxidizing the bismuth oxide again at a relatively low temperature of 300-650° C. in air or oxygen gas environment.

An apparatus for preparing high-purity bismuth oxide according to the present invention has advantages of simple operation, high efficiency, and easy maintenance, because bismuth oxide obtained from a first reactor is collected by a collecting device having an exhaust fan and un-reacted bismuth is oxidized again by a second reactor in air or oxygen gas environment.

Further, in the apparatus for preparing high-purity bismuth oxide according to the present invention, the production rate of bismuth oxide may be controlled by installing a storage tank between the collecting tank and second reactor.

BRIEF DESCRIPTION OF DRAWINGS

FIG. 5 is another graph showing an X-ray diffraction analysis result of bismuth oxide obtained by a preparation method according to another exemplary embodiment of the present invention.

BEST MODE FOR CARRYING OUT THE INVENTION

Hereinafter, exemplary embodiments of the present invention are described in detail with reference to the accompanying drawings.

Figure 1:
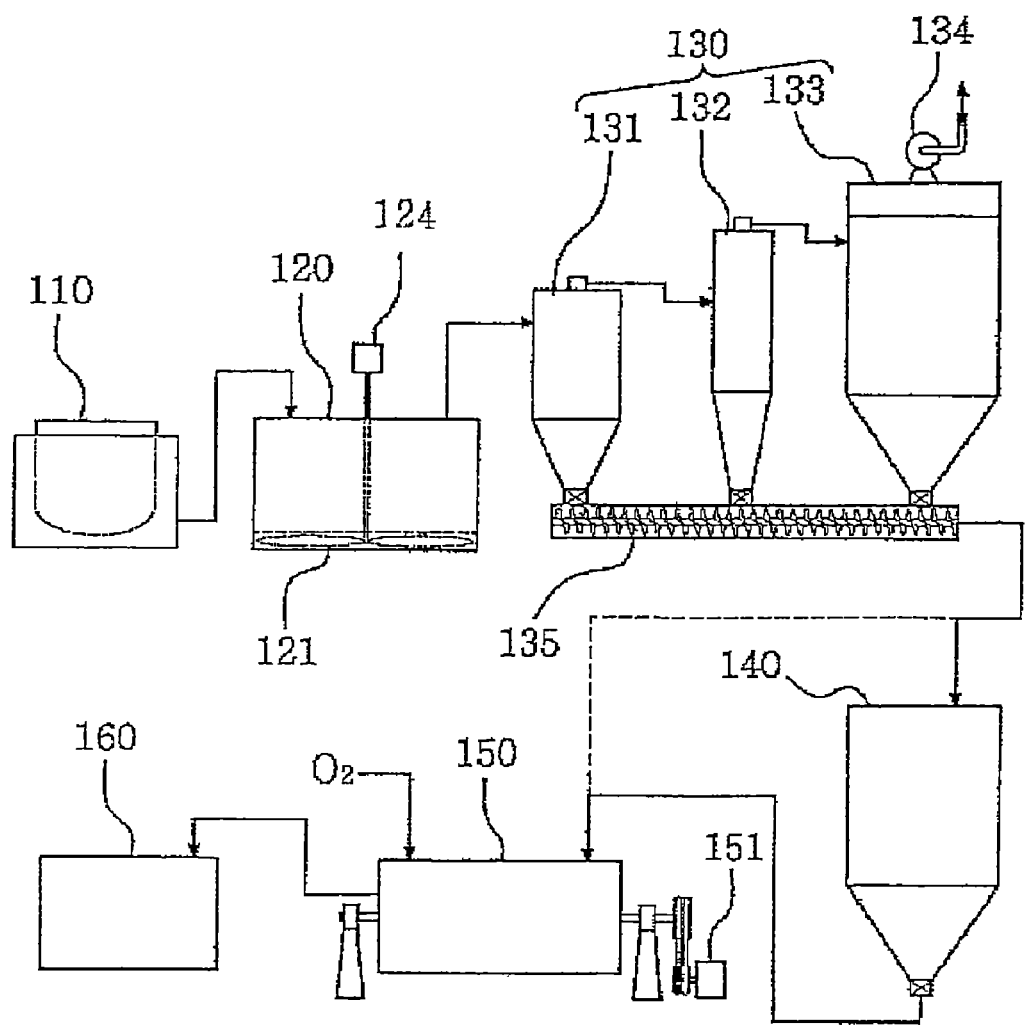
FIG. 1 is a schematic view showing a configuration of an apparatus for preparing bismuth oxide according to an exemplary embodiment of the present invention.
Figure 2:
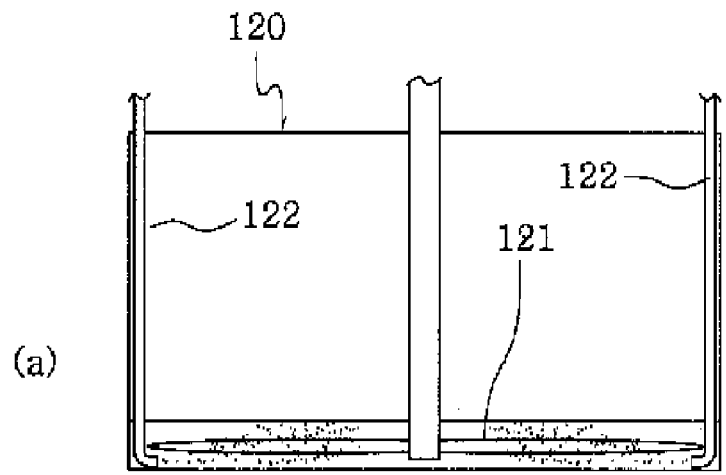
FIG. 2 is an enlarged sectional view showing a detailed structure of a first reactor in the apparatus of FIG. 1.
Figure 2:
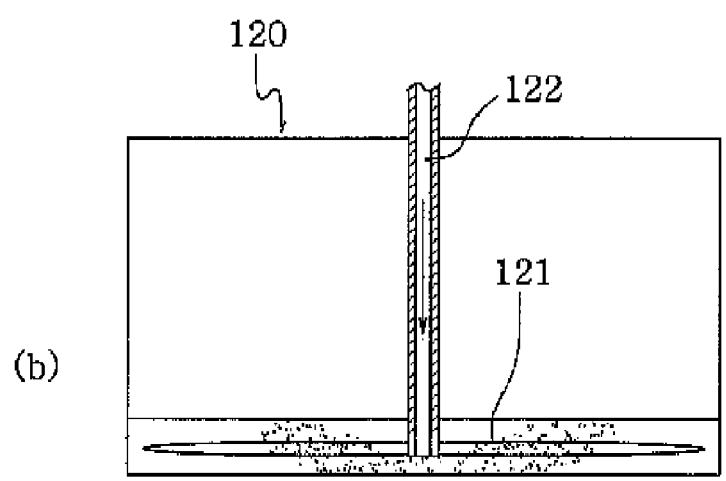
Figure 3:
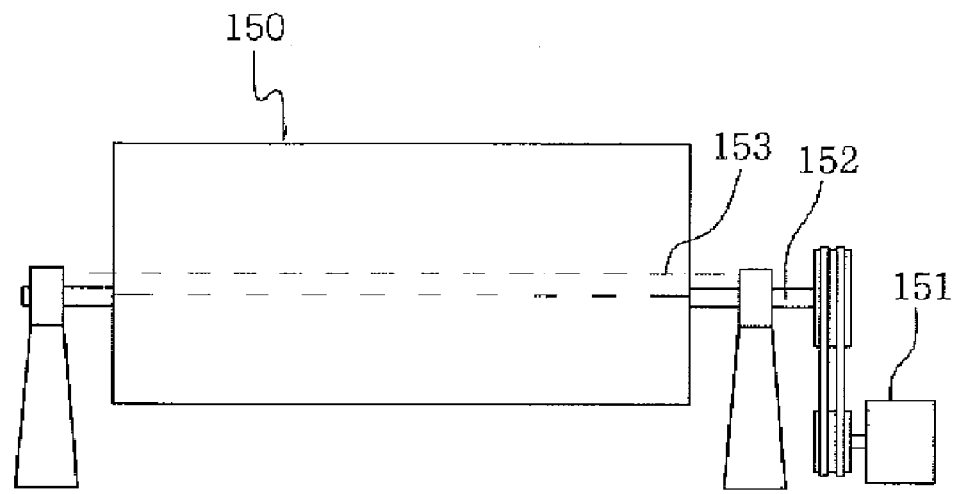
FIG. 3 is an enlarged sectional view showing a detailed structure of a second reactor in the apparatus of FIG. 1.

FIG. 1 is a schematic view showing a configuration of an apparatus for preparing bismuth oxide according to an exemplary embodiment of the present invention, FIG. 2 is an enlarged sectional view showing a detailed structure of a first reactor in the apparatus of FIG. 1, and FIG. 3 is an enlarged sectional view showing a detailed structure of a second reactor in the apparatus of FIG. 1.

Referring to FIG. 1, the apparatus for preparing bismuth oxide includes: a melting tank 110 for melting bismuth metal at a high temperature; an open first reactor 120 having an internal impeller 121 driven by a motor 124 for primary oxidation of the melted bismuth metal; a collecting device 130 having an exhaust fan 134 for collecting bismuth oxide in the first reactor 120 by using differential pressure; a closed second reactor 150 having an internal screw driven by a motor 151 and an oxygen inlet for secondary oxidation of the bismuth oxide collected by the collecting device 130; and a pulverizer 160 for pulverizing the obtained fine powder bismuth oxide.

The melting tank 110 is a device for melting bismuth metal, and the temperature inside the melting tank 110 may be maintained at a temperature higher than the melting point of bismuth (271° C.). However, the temperature inside the melting tank 110 is preferably maintained at a temperature of 300° C. or higher than 300° C. for high reaction speed and productivity considering that the temperature of the first reactor 120 is at 300-650° C.

In particular, the temperature inside the first reactor 120 is preferably maintained constantly by supplying hot air so that the hot air may contact with the surface of the melted bismuth supplied into the first reactor 120. When the melted bismuth is supplied into the first reactor 120, the hot air reduces scale formation at the inner wall of the first reactor 120 and at the shaft of the impeller 121, which is caused by a difference between the temperature of melted bismuth in the first reactor 120 and the temperature of melted bismuth supplied from the melting tank 110. The temperature of the hot air may be 200-450° C. and is not particularly limited. However, the temperature of hot air is preferably 300-450° C.

The first reactor 120 is controlled to maintain the reaction temperature at 300-600° C. and primarily oxidizes the melted bismuth supplied from the melting tank 110. The melted bismuth in the first reactor 120 is oxidized while stirring with the impeller 121 driven by the motor 124.

The impeller 121 rotates on a vertical axis, and the distance between the lower surface of the impeller 121 and the bottom inner surface of the first reactor 120 is preferably set as small as possible. In a case that the distance between the lower surface of the impeller 121 and the bottom inner surface of the first reactor 120 is large, stirring is not sufficient, and unreacted bismuth may deposit on the bottom inner surface of the first reactor 120.

The temperature inside the first reactor 120 is maintained constantly by supplying hot air so that the hot air may contact with the surface of the melted bismuth supplied into the first reactor 120. When the melted bismuth is supplied into the first reactor 120, the hot air reduces scale formation at the inner wall of the first reactor 120 and at the axis of the impeller 121, which is caused by a difference between the temperature of melted bismuth in the first reactor 120 and the temperature of melted bismuth supplied from the melting tank 110.

Air or oxygen gas may be supplied into the first reactor 120 to accelerate oxidation of bismuth, as shown in FIG. 2. Referring to FIG. 2A, an injection pipe 122 is installed at a proper position in the first reactor 120 to supply air or oxygen gas from an air/oxygen supplier (not shown). The outlet of the injection pipe 122 is submerged in the melted bismuth such that the air or oxygen gas is directly injected into the melted bismuth.

Alternatively, the injection pipe 122 may be installed inside the axis of the impeller 121, and air or oxygen gas may be injected through an inner space of the impeller 121, as shown in FIG. 2B. Accordingly, the structure of the first reactor 120 may be simplified, because the injection pipe 122 is not installed aside from the impeller 121 in the first reactor 120. In this case, a powerful motor is necessary for driving the impeller 121, because a large amount of driving power is required for stirring of melted bismuth in the first reactor 120.

The collecting device 130 is controlled to collect bismuth oxide formed in the first reactor 120, and includes a settling tank 131 for stabilizing bismuth oxide supplied from the first reactor 120, a cyclone 132 for circulating air to be sucked by an exhaust fan 134 and generating air turbulence, and a collecting tank 133 having an exhaust fan 134 for collecting bismuth oxide. Further, a screw 135 for transporting bismuth oxide is installed at the bottom of the settling tank 131, cyclone 132 and collecting tank 133.

The collecting device 130 works as follows:

If the exhaust fan 134 is driven, the pressure inside the collecting tank 133 is dramatically reduced, and air of the first reactor 120 flows towards the collecting tank 133 through the settling tank 131 and cyclone 132. Accordingly, differential pressure is formed in the first reactor 120.

The air turbulence generated by the cyclone 132 accelerates airflow speed, and thereby the differential pressure in the first reactor 120 can be increased quickly.

According to the differential pressure generated in the first reactor 120, bismuth oxide, having a smaller specific gravity than bismuth metal, flows towards the settling tank 131 of the collecting device 130 and some stabilized bismuth oxide particles fall down and are transported by the screw 135. Some bismuth oxide particles that collide with the inner wall of the cyclone 132 by a centrifugal force fall down along the inner wall of the cyclone 132 and are transported by the screw 135. The remaining bismuth oxide particles move into the collecting tank 133, and are finally collected by the screw 135 and transported to the next device.

As bismuth oxide formed in the first reactor 120 moves towards the collecting device 130 and the account of bismuth in the first reactor 120 is reduced, the load of the motor 124 driving the impeller 121 is also reduced. Accordingly, a feeding rate of melted bismuth to the first reactor 120 may be controlled by detecting the load of the motor 124 and the amount of reacted and un-reacted bismuth in the first reactor 120 may be maintained properly all the time.

The storage tank 140 stores bismuth oxide transported by the screw 135. If necessary, a filtering process may be added to remove impurities from the transported bismuth oxide.

Bismuth oxide particles exhausted from the collecting device 130 may directly be transported to the closed second reactor 150 without passing through the storage tank 140, as shown by a dotted line in FIG. 1. The storage tank 140 is an optional item in the present invention.

The closed second reactor 150 is controlled to oxidize again reactant oxidized in the first reactor 120 and performs oxidation of an un-reacted material (residual bismuth) by using a screw (not shown) driven by the motor 151 in a closed tank while maintaining the temperature at 300-600° C.

Further, rapid oxidation may be induced by supplying oxygen gas into the closed second reactor 150. The pressure of the oxygen gas supplied to the closed second reactor 120 may differ according to a condition of the second reactor 150. If pure oxygen is supplied at the pressure of 1-2.5 Kgf/cm$^2$, rapid oxidation may be achieved without using the closed second reactor for high-pressure.

The closed second reactor 150 may be installed by using an eccentric axis, as shown in FIG. 3, to accelerate the oxidation in the second reactor 150. That is, if a center axis 153 of the closed second reactor 150 is installed eccentrically to a driving axis 152 of a motor 151, oxidation may be accelerated by a shaking effect while the closed second reactor 150 is rotating.

The pulverizer 160 pulverizes the bismuth oxide oxidized in the closed second reactor 150. A filtering process may be added prior to a pulverizing process to remove impurities from bismuth oxide.

MODE FOR THE INVENTION

Hereinafter, exemplary embodiments of the present invention are described in detail with reference to the accompanying drawings. However, the present invention is not limited to the described exemplary embodiments.

Example 1

Primary Oxidation

Bismuth metal ingot having the purity of 99.99% at temperature of 400-450° C. was continuously supplied at a feeding rate of 45 kg/hr to the melting tank 110 having the capacity of 1 m$^3$ while maintaining the temperature at 300-400° C. The temperature of the first reactor 120 having the capacity of 300 liter to which hot air is supplied was maintained at 300° C. The impeller 121 was driven at the speed of 50-100 rpm. The suction differential pressure at settling tank 131 or cyclone 132 was maintained at 20 mm H$_2$O by an exhaust fan connected to the collecting tank 130. Melted bismuth was transported to the first reactor 120 at the feeding rate of 45 Kg/hr and oxidized while stirring with the impeller 121.

The above procedure was repeated by changing the temperature of the first reactor 120 to 350, 400, 450, 500, 550, 600, and 650° C. Before transporting to the collecting device 130, samples of the reactant were collected to measure the contents of un-reacted bismuth in the samples. The result of the measurement is shown in percentages in Table 1.

Example 2

The same method as Example 1 was performed in Example 2 except that bismuth metal ingot was supplied at the feeding rate of 30 Kg/hr. The weights of un-reacted bismuth in collected samples were measured, and the result is shown in percentages in Table 1.

TABLE 1

| Reaction temperature | Content of un-reacted bismuth (%) | |
|---|---|---|
| | Example 1 | Example 2 |
| 300° C. | 75 | 55 |
| 350° C. | 70 | 50 |
| 400° C. | 48 | 25 |
| 450° C. | 17 | 2.8 |
| 500° C. | 8.4 | 0.87 |
| 550° C. | 3.2 | 0.08 |
| 600° C. | 1.3 | 0.05 |
| 650° C. | 0.5 | 0.04 |

Table 1 shows that the degree of oxidation increases as the reaction temperature increases. However, it was observed that aggregation of reactant is induced at a temperature higher than 650° C. It was also observed that the degree of oxidation decreases as the feeding rate of the raw material increases, because retention time of the raw material in the reactor decreases. In contrast, it was observed that the degree of oxidation increases as a feeding rate of the raw material decreases. Accordingly, the capacities of the reactor and the corresponding heating medium must be increased to increase the feeding rate of the raw material.

In the above examples, oxidation may be performed at 300-350° C., but it takes long time to complete the reaction because the degree of oxidation is as low as 25-50%. Accordingly, oxidation is preferably performed at 450-650° C. If the feeding rate of melted bismuth is slow, the oxidation speed increases, because the load of the motor driving the impeller becomes low and the contact surface of bismuth for reacting with oxygen in the air is increased.

Example 3

Reaction product obtained from the first reactor 120 at the reaction temperature of 650° C. and containing 0.04% un-reacted bismuth according to Example 2 was transported through the settling tank 131, cyclone 132 and collecting tank 133. Heavy particles transported through lower hoppers of the settling tank 131 and cyclone 132 were transported by the screw 135. Light particles transported to the collecting tank 133 were also transported by the screw 135. The heavy and light particles on the screw 135 were transported to the storage tank 140 or directly to the closed second reactor 150. The temperature of the closed second reactor 150 (capacity: 1 m$^3$) was maintained at 450° C. The second reactor 150 was rotated for 30 min at a speed of 3 rpm while injecting oxygen gas at the pressure of 2 Kgf/cm$^2$. Samples of the reactant were collected at 5, 10, 20, and 30 min after starting the reaction. The contents of un-reacted bismuth in the collected samples were measured to check reaction rates, and the result is shown in Table 2.

Example 4

The same method as Example 3 was performed except that reaction product obtained from the first reactor 120 at the reaction temperature of 500° C. and containing 0.87% un-reacted bismuth according to Example 2 was used. The contents of un-reacted bismuth in collected samples were measured to check reaction rates, and the result is shown in Table 2.

Example 5

The same method as Example 3 was performed except that reaction product obtained from the first reactor 120 at the reaction temperature of 450° C. and containing 2.8% un-reacted bismuth according to Example 2 was used. The contents of un-reacted bismuth in collected samples were measured to check reaction rates, and the result is shown in Table 2.

Example 6

The same method as Example 3 was performed except that reaction product obtained from the first reactor 120 at the reaction temperature of 500° C. and containing 8.4% un-reacted bismuth according to Example 1 was used. The contents of un-reacted bismuth in collected samples were measured to check reaction rates, and the result is shown in Table 2.

Comparative Examples 1-4

Comparative Examples 1-4 were prepared in the same methods as Examples 3-6 respectively except that oxygen gas was not injected. The contents of un-reacted bismuth in collected samples were measured to check reaction rates, and the result is shown in Table 2.

TABLE 2

| Oxygen Supply | Time (min) | Content of un-reacted material (%) | | | |
|---|---|---|---|---|---|
| | | Example 3 | Example 4 | Example 5 | Example 6 |
| Yes | 0 | 0.04 | 0.87 | 2.8 | 8.4 |
| | 5 | 0.02 | 0.03 | 0.03 | 1.2 |
| | 10 | 0.02 | 0.02 | 0.01 | 0.02 |
| | 20 | 0.01 | 0.01 | 0.005 | 0.005 |
| | 30 | 0.005 | 0.005 | 0.005 | 0.005 |

| | Time (hr) | Comparative Example 1 | Comparative Example 2 | Comparative Example 3 | Comparative Example 4 |
|---|---|---|---|---|---|
| No | 0 (initial) | 0.04 | 0.87 | 2.8 | 8.6 |
| | 1 | 0.025 | 0.65 | 2.75 | 3.2 |
| | 2 | 0.022 | 0.61 | 2.6 | 2.8 |
| | 3 | — | 0.57 | 2.4 | 2.2 |
| | 7 | — | 0.5 | 2 | 1.9 |
| | 10 | — | — | 1.5 | 1.3 |

Table 2 shows un-reacted bismuth contents (%) corresponding to the elapsed reaction time in the condition of stirring the closed second reactor 150 where the secondary oxidation occurs with supply of oxygen gas at the pressure of 2 Kgf/cm$^2$ and in the condition of stirring in a closed state without supply of oxygen gas. All the un-reacted bismuth contents after the secondary oxidation with oxygen injection show 0.005%. In contrast, un-reacted bismuth contents after the secondary oxidation without oxygen injection (Comparative Examples 3-4) show much higher percentages.

Example 7

The same method as Example 3 was performed except that reaction product obtained from the first reactor 120 at the reaction temperature of 650° C. and containing 0.04% un-reacted bismuth according to Example 2 was supplied to the second reactor 150 while maintaining the temperature at 500° C. and oxygen gas was injected for 20 min at the pressures of 1 Kgf/cm$^2$ and 2.5 Kgf/cm$^2$. The contents of un-reacted bismuth in collected samples were measured to check reaction rates, and the result is shown in Table 3.

TABLE 3

| | Oxygen pressure (Kgf/cm$^2$) | |
|---|---|---|
| | 1 | 2.5 |
| Content of un-reacted material (%) | 0.03 | 0.005 |

Referring to Table 3, it is identified that the oxidation rate in the second reactor depends on a feeding rate of oxygen.

Example 8

To test an oxidation efficiency in the second reactor 150, reaction product obtained from the first reactor 120 at reaction temperature of 500° C. and containing 0.87% un-reacted bismuth according to Example 2 was continuously supplied to the second reactor 150 and oxidized for 20 min by supplying oxygen gas at the pressure of 2 Kgf/cm$^2$ and by changing the reaction temperature to 300, 400, 450, 500, 550, and 600° C. The contents of un-reacted bismuth in collected samples were measured to check reaction rates, and the result is shown in Table 4.

TABLE 4

| Reaction temperature | Content of un-reacted material (%) |
|---|---|
| 300° C. | 0.046 |
| 400° C. | 0.025 |
| 450° C. | 0.018 |
| 500° C. | 0.010 |
| 550° C. | 0.005 |
| 600° C. | 0.004 |

Referring to Table 4, the reaction temperature of the second reactor 150 is preferably 400-600° C., and more preferably 450-600° C. when considering economical efficiency.

Comparative Example 5

The same method as Example 1 was performed for 8 hours a day except that hot air is not supplied. Scale formed on the inner wall of the first reactor 120 was measured after 7, 15, and 30 days. The result is shown in Table 5.

TABLE 5

| | Thickness of scale formed at inner wall of first reactor (mm) | |
|---|---|---|
| Days | Example 1 | Comparative example 5 |
| 7 | 2 | 8 |
| 15 | 5 | 23 |
| 30 | 11 | 47 |

As shown in Table 5, in the case that hot air is not injected, scale was formed significantly after 7 days, and after 15 days, the first reactor 120 reached a state that it can be operated no longer without cleaning the scale. In the case that hot air is supplied, the thickness of scale was only 11 mm after 30 days. Therefore, if hot air is supplied, the reaction system may operate efficiently by cleaning the scale deposited in the inner wall of the first reactor once a month.

Experimental Example 1

An X-ray diffraction (XRD) was used to identify a crystal structure of bismuth oxide obtained in the above examples. α-bismuth oxide (Aldrich, Purity 99.999%) was used as a reference material.

Sample 1 was prepared in a condition that melted bismuth was supplied to an open first reactor at a reaction temperature of 450° C. and at a feeding rate of 40 Kg/hr while maintaining suction floating pressure at 15 mm $H_2O$ and stirring with an impeller.

Sample 2 was prepared in a condition that melted bismuth was supplied to the open first reactor at a reaction temperature of 500° C. and at a feeding rate of 40 Kg/hr while maintaining suction floating pressure at 15 mm $H_2O$ and stirring with the impeller.

Sample 3 was prepared in a condition that melted bismuth was supplied to the first reactor at a reaction temperature of 550° C. and at a feeding rate of 20 Kg/hr while maintaining suction floating pressure at 10 mm $H_2O$ and stirring with the impeller.

Sample 4 was prepared in a condition that melted bismuth was supplied to the first reactor at a reaction temperature of 450° C. and at the feeding rate of 40 Kg/hr while maintaining suction floating pressure at 15 mm $H_2O$ and stirring with the impeller, and then the primarily oxidized bismuth was oxidized in a second reactor at 500° C. while supplying oxygen gas at the pressure 1 Kgf/cm².

Figure 4:
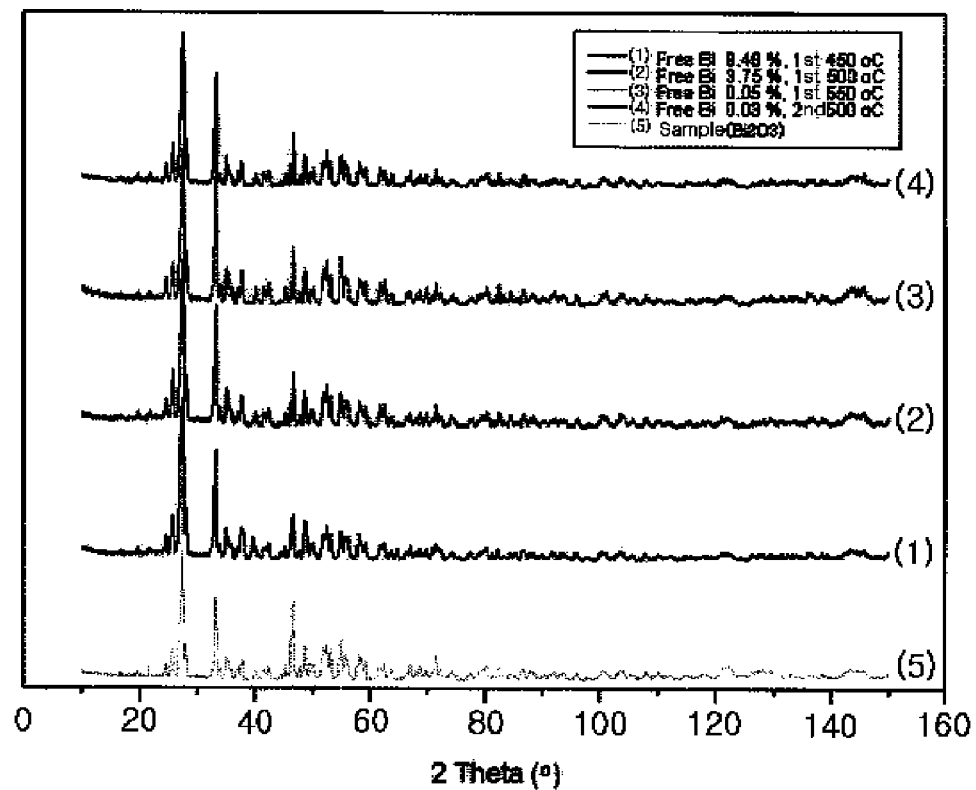
FIG. 4 is a graph showing an X-ray diffraction analysis result of bismuth oxide obtained by a preparation method according to another exemplary embodiment of the present invention.
Figure 4:
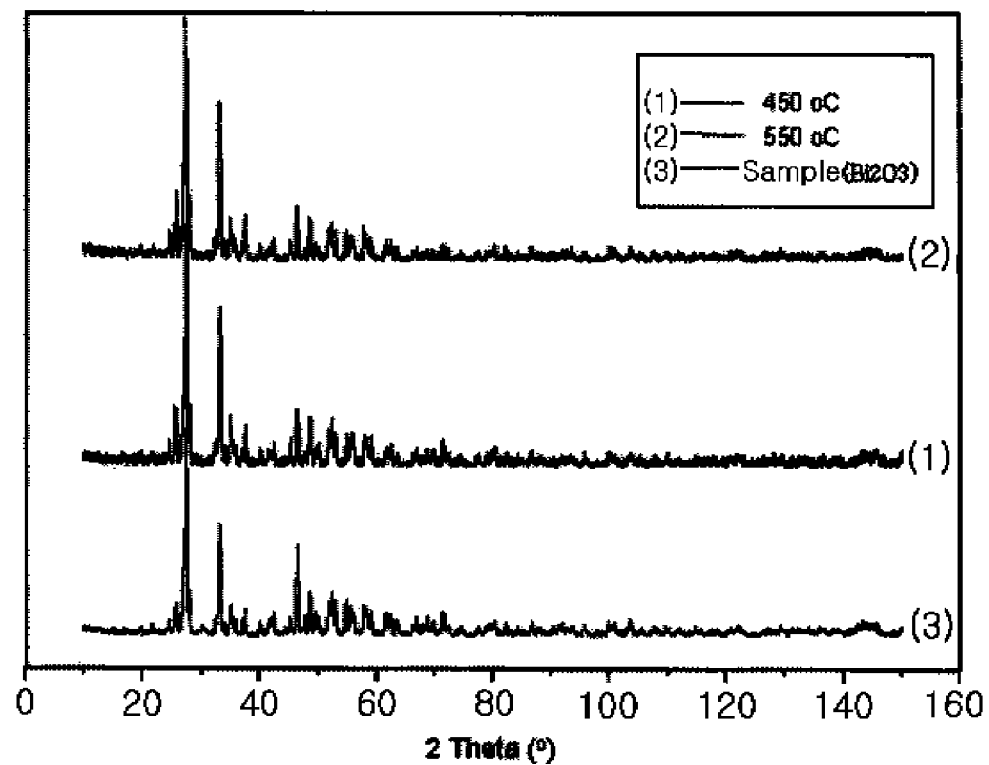

The above samples and the reference material of a-bismuth oxide were measured by an X-ray diffraction, and the result is shown in FIG. 4. All the above samples showed the same peak points as those of the reference material.

Experimental Example 2

The same method as preparing sample 4 in Experimental Example 1 was performed except that the reaction temperature of the second reactor was maintained at 450° C. Collected samples were measured by the X-ray diffraction in the same method as Experimental Example 1, and the result is shown in FIG. 5.

According to Experimental Examples 1 and 2, all the bismuth oxides prepared according to the exemplary embodiment of the present invention were identified to be an α-type.

The invention claimed is:

1. A method of preparing bismuth oxide comprising:
   melting bismuth metal;
   transporting the melted bismuth metal to an open first reactor and oxidizing the melted bismuth metal at a temperature of 300-650° C. while stirring; and
   transporting bismuth oxide and un-reacted material to a closed second reactor through a screw and oxidizing the bismuth oxide and un-reacted material while rotating the second reactor at a temperature of 300-600° C. with a supply of air or oxygen.

2. The method of preparing bismuth oxide according to claim 1, wherein the bismuth metal is melted at the temperature of 300-450° C.

3. The method of preparing bismuth oxide according to claim 1, wherein the bismuth metal is melted at the temperature of 400-450° C.

4. The method of preparing bismuth oxide according to claim 1, wherein oxidation is executed in the first reactor at the temperature of 400-600° C.

5. The method of preparing bismuth oxide according to claim 1, wherein oxidation is executed in the second reactor at the temperature of 400-600° C.

6. The method of preparing bismuth oxide according to claim 1, wherein hot air of 200-450° C. is supplied into the first reactor.

7. The method of preparing bismuth oxide according to claim 6, wherein hot air of 300-450° C. is supplied into the first reactor.

8. The method of preparing bismuth oxide according to claim 1, wherein bismuth oxide is collected by an exhaust fan installed in a collecting device while maintaining the pressure inside the collecting device at 10-30 mm $H_2O$.

9. The method of preparing bismuth oxide according to claim 1, wherein the air or oxygen is injected into the second reactor at a pressure of 1-2.5 Kgf/cm².

10. An apparatus for preparing bismuth oxide comprising:
    a melting tank (110) for melting bismuth metal at a high temperature;
    a first reactor (120) having an internal rotating impeller (121) for primary oxidation of the melted bismuth metal;
    a collecting device (130) having an exhaust fan (134) for collecting bismuth oxide formed in the first reactor (120) by differential pressure; and
    a closed second reactor (150) and an oxygen inlet for secondary oxidation of bismuth oxide collected by the collecting device (130).

11. The apparatus for preparing bismuth oxide according to claim 10, further comprising a pulverizer (160) for pulverizing bismuth oxide exhausted from the second reactor (150).

12. The apparatus for preparing bismuth oxide according to claim 10, further comprising an injection pipe (122) for supplying air or oxygen into the first reactor (120).

13. The apparatus for preparing bismuth oxide according to claim 12, wherein the injection pipe (122) is formed in the axis of an impeller (121).

14. The apparatus for preparing bismuth oxide according to claim 10, wherein the collecting device (130) comprises:
    a settling tank (131) for stabilizing bismuth oxide supplied from the first reactor (120);
    a cyclone (132) for circulating air flow to be sucked by an exhaust fan (134); and
    a collecting tank (133) having the exhaust fan (134) for collecting the bismuth oxide.

15. The apparatus for preparing bismuth oxide according to claim 14, further comprising a screw (135) installed at the bottom of the settling tank (131), cyclone (132) and collecting tank (133) for transporting bismuth oxide.

16. The apparatus for preparing bismuth oxide according to claim 10, wherein a center axis (153) of the second reactor (150) is installed eccentrically to a driving axis (152).

17. The apparatus for preparing bismuth oxide according to claim 10, further comprising a storage tank (140) between the collecting device (130) and second reactor (150) for storing bismuth oxide exhausted from the collecting device (130).

* * * * *